United States Patent [19]

Glasheen et al.

[11] Patent Number: 4,858,474

[45] Date of Patent: Aug. 22, 1989

[54] ANGULAR MOMENTUM MASS FLOWMETER WITH OPTICAL PICKOFF

[75] Inventors: William M. Glasheen, Derry; Christopher R. Mayer, Windham, both of N.H.

[73] Assignee: General Electric Co., Schenectady, N.Y.

[21] Appl. No.: 141,179

[22] Filed: Dec. 30, 1987

[51] Int. Cl.⁴ ............................................... G01F 1/82
[52] U.S. Cl. ............................. 73/861.35; 73/861.77
[58] Field of Search ..................... 73/861.35, 861.77; 250/231 SE

[56] References Cited

U.S. PATENT DOCUMENTS

| | | | |
|---|---|---|---|
| 3,364,743 | 1/1968 | Clinton . | |
| 3,575,052 | 4/1971 | Lenker | 73/861.35 |
| 3,604,265 | 9/1971 | Wilson | 73/861.35 |
| 3,613,451 | 10/1971 | Scott | 73/861.35 |
| 3,731,373 | 5/1973 | Johnson | 250/231 SE |
| 4,012,957 | 3/1977 | Chiles et al. | 73/861.35 |
| 4,162,399 | 7/1979 | Hudson | 250/231 SE |
| 4,433,583 | 2/1984 | Kirk | 73/861.33 |
| 4,438,648 | 3/1984 | Cheney, Jr. | 73/861.35 |
| 4,536,650 | 8/1985 | Carena et al. | 250/231 SE |

Primary Examiner—Herbert Goldstein
Attorney, Agent, or Firm—I. D. Blumenfeld

[57] ABSTRACT

An angular momentum mass flow meter with an optical fiber readout extending into and out of the flowmeter housing.

4 Claims, 2 Drawing Sheets

ANGULAR MOMENTUM MASS FLOWMETER WITH OPTICAL PICKOFF

SUMMARY OF THE INVENTION

This invention relates to an angular momentum mass flowmeter with an optical readout. More particularly, it relates to an angular momentum mass flowmeter utilizing a pair of optical fibers to illuminate one of the flowmeter rotating elements with a beam of radiant energy. Beam interrupting means on the rotating element are used to indicate the phase angle between the rotating flowmeter elements as a measure of mass flow.

BACKGROUND OF THE INVENTION

One well known form of angular momentum mass flowmeters utilize magnets positioned on the turbine and/or the swirl generating impeller elements of the flowmeter. Reference is hereby made to U.S. Pat. No. 4,301,276 issued Dec. 3, 1983, for an illustration of such a flowmeter arrangement. In flowmeters of this type, mass flow is measured by measuring the time interval necessary for the magnets to move through a displacement angle $\theta$ between the turbine and impeller elements. The displacement angle $\theta$ is a function of the fluid torque exerted on the turbine element by the angular momentum of the fluid being measured. Sensing coils are mounted on the housing of the flowmeter to produce an output signal whenever the magnets pass by and come into flux exchange relationship with the coils. However, such arrangements are both bulky and costly. A need therefore exists for a small, light weight flowmeter readout which make it possible to reduce the size and weight of the overall flowmeter. This is particularly critical where mass flowmeters are utilized in applications, such as aircrafts, for example, where weight and size are at a premium.

In addition to the size, weight and cost disadvantage of magnet and winding pick-offs they also perform poorly at low flow ranges because the attraction forces between the magnet and windings (which can exceed static bearing forces) can prevent start-up at low flows with high viscosity fluids (i.e., cold fuel). In addition, performance of flowmeters using electromagnetic pick-offs are vulnerable to EMI/EMP/and lightning effects.

Applicant has found, that the size and weight of the flowmeter may be reduced by providing an optical readout which utilizes a pair of optical fibers extending into and out of the flowmeter housing, A beam of radiant energy (which may include energy both in and outside of the visible spectrum) is introduced into the flowmeter by an input fiber. The beam illuminates and is reflected from one of the flowmeter rotating elements. The reflected beam is received by and brought out of the flowmeter by an output optical fiber. Each rotating element contains a base interrupting means which interrupts the beam of radiant energy between the input and output fibers during each rotation thereby permitting measurement of the phase angle $\theta$ established between the two rotating components due to the angular momentum of the fluid being measured.

An optical pick-off of this type is both lighter, less costly, and smaller than electromagnetic pick-offs. Furthermore, such an optical pick-off is not subject to EMI/EMP and lightning effects nor is it subject to the magnetic attraction effects which limit operation of flowmeters using electromagnetic pick-offs at low flow rates. A further benefit of the invention is that a single pick-off fiber pair is adequate to detect the "start" reference point as well as the "stop" reference point on the rotating elements whereas separate pick-offs are required in electromagnetic systems.

It is therefore a principal objective of the invention to provide a flowmeter utilizing an optical readout.

A further objective of the invention is to provide a mass flowmeter utilizing a fiber optic readout.

Still another objective of the invention is to produce a small, light weight flowmeter utilizing a fiber optic readout.

Further objectives and advantages of the invention will become readily apparent as the description thereof proceeds.

BRIEF DESCRIPTION OF THE INVENTION

The various objectives and advantages of the invention are realized in an arrangement in which an angular momentum mass flowmeter has two rotating components joined by a torque resistant spring. The phase angle established between the two rotating components as a result of the angular momentum is proportional to the mass flow rate and is measured by a fiber optic pick-off. An input fiber which extends axially within the flowmeter housing transmits a beam of radiant energy to the axial face of the flowmeter turbine. An output optic fiber, which also extends axially within the flowmeter housing, is positioned to receive the beam of radiant energy reflected from the face of the rotating turbine. Both the impeller and turbine include beam interrupting means which interrupt the beam during each rotation. The beam interrupting means on the impeller takes form of a radial extension or flag which passes between the face of the turbine and the optical fibers. The beam interrupting means on the turbine takes the form of a notch or bevel at the radial edge of the turbine when the notch is aligned with the optical fibers it deflects the radiant energy beam away from the output optical fiber thus interrupting the beam. As a phase angle is established between the rotating impeller and turbine, the time interval between the beam interruptions then becomes a measure of the mass flow.

BRIEF DESCRIPTION OF DRAWINGS

FIG. 1 is an exemplary illustration of a flowmeter utilizing a fiber optic pickoff. The flowmeter of FIG. 1 is shown generally at 10 and shows a housing 11 (partially broken away) having inlet and outlet ends 12 and 13. A turbine 14 and an impeller swirl generator 15 in housing 11 are mounted on shaft 16 which is journaled at both ends on suitable ball bearings 18 with only the ball bearings 18 on the downstream end shown in FIG. 1.

Figure 1:
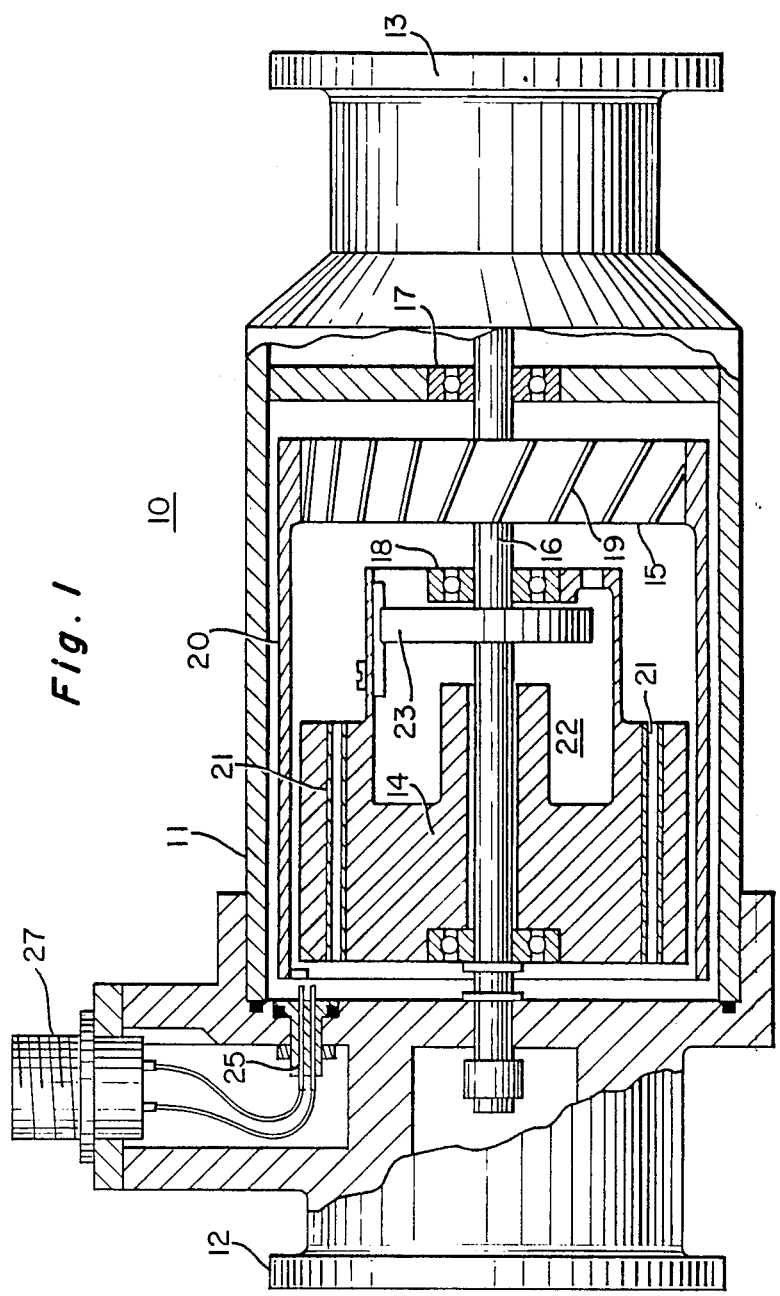
FIG. 1 is a partially broken away view of an angular momentum mass flowmeter having optical fiber readout.

The turbine and swirl imparting impeller elements are coupled by a torque resistant element so that an angular displacement occurs in response to angular momentum which is proportional to mass flow rate of the fluid stream.

Turbine 14 is journaled on shaft 16 by means of ball bearings 18. Swirl generating impeller 15, on the other hand, is secured directly to shaft 16. Impeller 15 consists of a main body portion having a plurality of skewed vanes 19. The impact of the fluid on the vanes imparts an angular velocity to the fluid and to the impeller. Since impeller 15 is secured directly to shaft 16, rotation of the impeller causes the shaft to rotate at some angular velocity governed by the mass flow rate of the fluid. A cylindrical shroud 20 extends from the periphery of impeller 15 and is concentric with and surrounds turbine 14. Thrust bearings, not shown, space the turbine and impeller/swirler along the shaft and are located between the turbine and the impeller and on the outside of the turbine and impeller.

A plurality of fluid passages in the form of tubes 21 extend through and are distributed around the periphery of turbine 14. A re-entrant portion 22 on the downstreams side of the turbine 14 has one end a helical spring 23 secured to the inner wall of the re-entrant portion with the other end of the spring being secured to shaft 16. In effect, impeller 15 and turbine 14 constitute two rotating elements joined by a torque resistant spring. Thus, while the two elements rotate at the same rate, the fluid torque acting on the turbine, will cause the turbine to be displaced with respect to the impeller by an angle $\theta$ which is linear function of the mass rate of flow.

Figure 2:
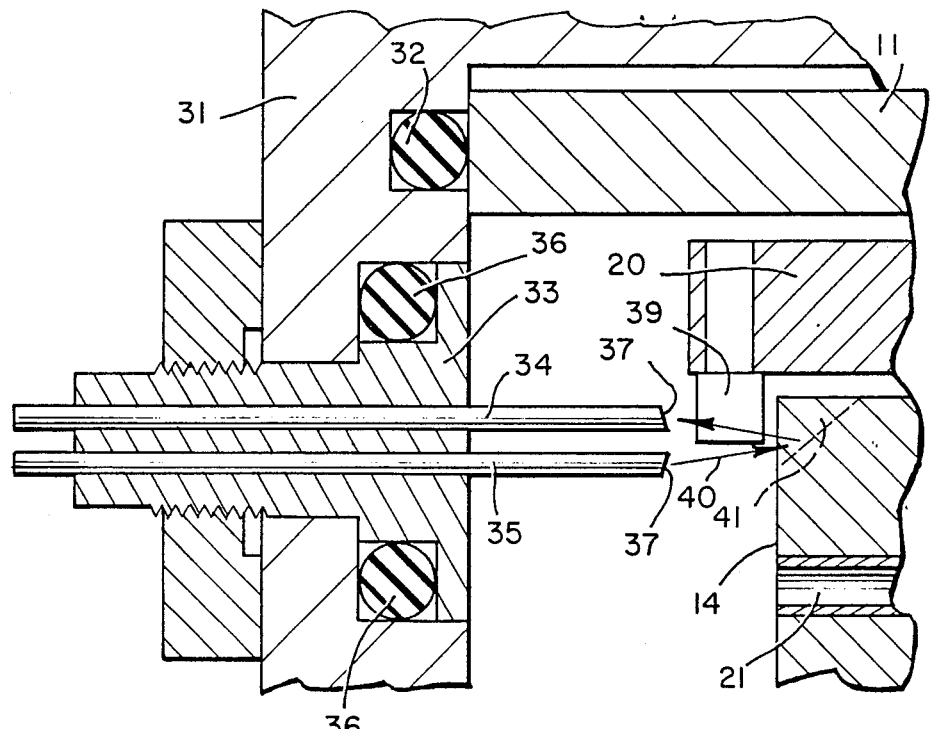
FIG. 2 is a detail view of a portion of the flowmeter of FIG. 1 illustrating the optical fibers and the individual beam interrupting means on the turbine and impeller.

Readout of phase angle $\theta$ which is representative of the mass rate of flow is achieved by means of a fiber optic readout shown generally at 25. A pair of optical fibers 26 are brought into the turbine housing through connector 27. The optical fibers, as will be explained more clearly in connection with the detailed showing of FIG. 2, are positioned to illuminate the axial face of turbine 14 at its radial edge. One optical fiber carries radiant energy from a remote source and is thus the input fiber while the other, or output optical fiber is positioned to receive energy reflected from the turbine and carries that energy to a remote sensor.

Both turbine 14 and impeller shroud 20 surrounding the turbine carry beam interrupting means to block transmission of the beam of radiant energy from the input to the output fiber for a relatively short interval during each rotation. The beam interrupting means associated with the shroud is a radial projection or flag which passes between the fibers and the axial face of the turbine during each rotation, while the beam interrupting means on the turbine takes the form of a beveled or notched portion on the perimeter of the turbine. When the notch is aligned with the fibers, it interrupts passage of the beam to the output fiber by directing the radiant energy away from the output fiber.

As fluid passes through the flowmeter, impeller swirl generator 15 imparts angular velocity to the impeller, shaft, turbine combination. The angular acceleration of the incoming fluid through tubes 21 causes turbine 14 to displace angularly relative to the shaft thereby causing spring 23 to deflect through some angle $\theta$ until the spring torque equals the fluid torque. Rather than measuring the angular displacement $\theta$ of the spring directly, the beam interrupting means associated with the turbine end impeller are used to measure the time required for reference points on the turbine and on the impeller, (as represented by the beam interrupting means) to move through displacement angle $\theta$ between turbine and the impeller. Angle $\theta$ can then be determined by measuring the elapsed time between the signal represented by passage of the beam interrupting means on the shroud and the passage of the beam interrupting bevel or notch on the turbine past the optical fibers.

FIG. 2 illustrates the details of the fiber optic probe and shows the input and output optical fibers, and the individual beam interrupting means associated with the turbine and impeller. FIG. 2 shows a portion of flowmeter housing 11, sealed by O-rings 32 to an end plate 31. Extending through end plate 31 is a fiber support plug 33 through which input optical fiber 34 and output fiber 35 are brought into the flowmeter cavity. Optical fibers 34 and 35 extend axially into the flowmeter and are equidistant from the center of the plug. Optical fiber support element 33 is sealed to end plate 31 by means of O rings 36. Input and output fibers 34 and 35 are positioned to look at the radial edge of turbine 14. The faces of input and output fibers 34 and 35 are polished at an angle 37 with the angle being such that input radiant energy from fiber 34 is projected to turbine 14 and is reflected from the vertical surface of the turbine to output fiber 35.

Impeller shroud 20 which extends axially beyond the end of turbine 14 and has a radially extending projection or flag 39 which acts as a beam interrupting means. Flag 39 is located so that it passes between the ends of optical fibers 34 and 35 and the axial face of turbine 14. When flag 39 moves between the fiber and the turbine during each rotation of the impeller shroud passage of the input radiant energy beam (as shown by the arrows 40) to output fiber 35 is blocked.

A bevelled or wedge shaped notch (shown by the dashed line 41) on the edge of turbine 15 acts as a beam interrupting means on the turbine by deflecting the radiant energy beam from the output fiber thereby effectively blocking the radiant beam during each rotation of the turbine.

Figure 3:
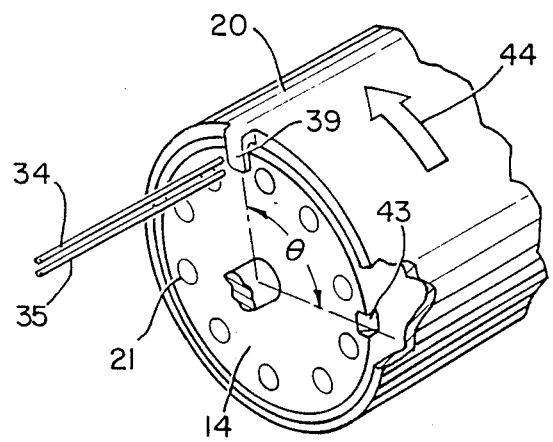
FIG. 3 is a perspective end view of the fiber of the turbine and impeller showing the beam interrupting means and the relative phase angle between them at a given mass flow rate.

FIG. 3 is a simplified perspective view showing the upstream end of turbine 14 and impeller shroud 20. Thus, flag 39 extends from the periphery of shroud 20 and once during each rotation passes between the optical fibers and the turbine face to interrupt the radiant energy beam. Interruption of the beam is sensed at the remote electronics to generate a start pulse. The beam interruption means on the axial face of turbine 14 takes the form of a wedge or bevel 43 along the periphery of turbine 14. For the sake of simplicity of illustration the rotating elements are shown as rotating in a counter clockwise direction as illustrated by the arrow 44 on the shroud.

It will be obvious from reference to FIG. 1 that with the vanes as shown in FIG. 1 the rotation is actually clockwise. However, assuming a counter clockwise rotation as shown in FIG. 3, turbine 14 is displaced from and lags shroud 20 by a phase angle $\theta$ which is the angle at which the fluid torque exactly equals the spring torque of spring 23 in FIG. 1. Thus, flag 39 and notch 43 represent reference points on the two rotating elements which can be used to produce start and stop pulses as they pass by the optical fiber energy transmitting means; with the time interval between pulses then being readily measured in the remote electronics to provide a direct indication of the mass flow rate of the fluid.

It will be apparent from the previous description that the flowmeter utilizing fiber optic pickoff has many advantages compared to techniques involving magnets and pick-off windings. That is, with an optical fiber pickoff there is no magnetic attraction which can prevent the flowmeter from starting at low flows with high viscosity fuels. Thus, with a fiber-optic pick-off start-up occurs at much lower flows. Furthermore, optical fiber pickoffs, unlike magnet and winding arrangements, are invulnerable to electromagnetic interference, lightning effects and EMP effects. Perhaps most importantly, size, weight and cost of the flowmeter can be substantially reduced by eliminating the bulky and complex coils.

While the instant invention has been described in connection with a preferred embodiment thereof, the invention itself is by no means limited thereto since many modifications in the instrumentalities employed and structures utilized may be made without departing from the true scope and spirit of the invention.

What is claimed as new and desired to be secured by United States Letters Patent is:

1. A mass rate flowmeter comprising in combination:
   (a) a flowmeter housing for receiving a stream of fluid whose mass flow rate is to be measured;
   (b) angularly restrained rotating turbine and impeller elements coaxially mounted within said housing, said turbine and impeller elements being subject to angular displacement in response to the mass rate of flow of the fluid through said housing;
   (c) optical means fixedly located within said housing at a pickoff position for measuring said angular displacement between said turbine and impeller elements, said optical means including
      (1) an input optic fiber for directing an incident beam of radiant energy at a surface of one of said turbine and impeller elements, and
      (2) an output optic fiber for receiving radiant energy reflected from said element surface; and
   (d) radiant energy beam interrupting means including
      (1) a single first reference point carried by said element surface for momentarily deflecting the reflected radiant energy from said output optic fiber during movement past said pickoff position with each revolution of said element surface, and
      (2) a single second reference point carried by the other of said impeller and turbine elements for momentarily blocking said incident radiant energy beam during movement past said pickoff position with each revolution of said other element,
      (3) whereby the time interval between the moments of movements of said first reference point and said second reference point past said pickoff position during each revolution of said impeller and turbine elements indicates said angular displacement.

2. The mass rate flowmeter defined in claim 1, wherein said first reference point is a notch formed in said element surface, and said second reference point is a flag carried by said other element.

3. The mass rate flowmeter defined in claim 2, wherein said element surface is carried by said turbine element and said flag is carried by said impeller element.

4. The mass rate flowmeter defined in a claim 3, wherein said element surface is a radial surface of said turbine element, and said flag extends radially into blocking relation with said incident radiant energy beam.

* * * * *